(12) United States Patent
Yu et al.

(10) Patent No.: US 10,799,830 B2
(45) Date of Patent: Oct. 13, 2020

(54) REDUCED TEMPERATURE HYDROCARBON BURNER FOR ENCLOSED ENVIRONMENTS

(71) Applicant: Hamilton Sundstrand Corporation, Charlotte, NC (US)

(72) Inventors: Ping Yu, West Hartford, CT (US); Benjamin Elmer Bishop, South Glastonbury, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 462 days.

(21) Appl. No.: 15/864,048

(22) Filed: Jan. 8, 2018

(65) Prior Publication Data
US 2019/0209964 A1    Jul. 11, 2019

(51) Int. Cl.
*B01J 8/08* (2006.01)
*B01J 7/00* (2006.01)
(Continued)

(52) U.S. Cl.
CPC ......... *B01D 53/864* (2013.01); *B01D 53/343* (2013.01); *B01D 53/8696* (2013.01); *B01J 23/34* (2013.01); *B01J 23/42* (2013.01); *B01J 23/44* (2013.01); *B01J 23/462* (2013.01); *B01J 23/52* (2013.01); *B01J 23/72* (2013.01); *F28D 17/04* (2013.01); *B01D 2255/106* (2013.01); *B01D 2255/1021* (2013.01); *B01D 2255/1023* (2013.01); *B01D 2255/1026* (2013.01); *B01D 2255/2065* (2013.01); *B01D 2255/2073* (2013.01); *B01D 2255/2092* (2013.01); *B01D 2255/20707* (2013.01); *B01D 2255/20761* (2013.01); *B01D 2255/30* (2013.01); *B01D 2255/702* (2013.01); *B01D 2255/9202* (2013.01); *B01D 2255/9205* (2013.01); *B01D 2259/65* (2013.01)

(58) Field of Classification Search
CPC .......... A61L 2209/00; A61L 9/00; A61L 9/02; A61L 9/16; A61L 2209/16; F24F 3/16; Y02A 50/2328
USPC ................ 422/217, 191, 144, 198; 423/237; 34/371; 48/61
See application file for complete search history.

(56) References Cited

FOREIGN PATENT DOCUMENTS

| CN | 101036826 | * | 9/2007 | ............. A62B 11/00 |
|----|-----------|---|--------|------|
| CN | 104353455 |   | 2/2015 |  |
| WO | 2016102567 |  | 6/2016 |  |

OTHER PUBLICATIONS

The European Patent Office English Translation of the Description and the Claims Sections of CN 101036826.*

* cited by examiner

*Primary Examiner* — Monzer R Chorbaji
(74) *Attorney, Agent, or Firm* — Carlson, Gaskey & Olds, P.C.

(57) ABSTRACT

A hydrocarbon burner for an enclosed environment includes a heat exchanger having a first heat exchanger inlet connected to an inlet of the hydrocarbon burner and a first heat exchanger outlet connected to a heater, and a second heat exchanger inlet connected to a reactor outlet and a second heat exchanger outlet connected to an outlet of the hydrocarbon burner. A reactor includes a reactor inlet, the reactor outlet, and a catalyst mixture disposed in a reactor bed between the reactor inlet and the reactor outlet. The heater connects the first heat exchanger outlet to the reactor inlet. The reactor is a low temperature reactor configured to convert at least one hydrocarbon to at least one of H2O and CO2.

19 Claims, 1 Drawing Sheet

(51) Int. Cl.
*F26B 3/08* (2006.01)
*B01D 53/86* (2006.01)
*B01J 23/42* (2006.01)
*B01J 23/52* (2006.01)
*B01J 23/44* (2006.01)
*B01J 23/46* (2006.01)
*B01J 23/72* (2006.01)
*B01J 23/34* (2006.01)
*B01D 53/34* (2006.01)
*F28D 17/04* (2006.01)

REDUCED TEMPERATURE HYDROCARBON BURNER FOR ENCLOSED ENVIRONMENTS

TECHNICAL FIELD

The present disclosure relates generally to air recirculation for enclosed environments, and more specifically to a hydrocarbon burner for removing hydrocarbons from an enclosed environment.

BACKGROUND

Enclosed habitable environments designed for extended human habitation typically generate a gradual buildup of contaminants, such as hydrocarbons, within the air. The contaminants can include saturated hydrocarbons such as methane, ethane, various alcohols such as butanol, propanol, and many other unsaturated hydrocarbons. By way of example, certain contaminants are generated due to typical human metabolic processes. Over extended periods of time, such as weeks or years, some or all of the contaminants must be removed from an enclosed habitable environment in order to prevent the contaminant levels from reaching concentrations that may be harmful to people or animals living within the enclosed environment.

In addition to the metabolic processes, personal care products, foods, lubricants, other chemicals necessary for human comfort and for machine operation and maintenance can contain or produce vapors of a wide variety of hydrocarbons. Even further still, metallic and non-metallic materials utilized in the construction of the environment, or in machines within the environment, can outgas various substances due to treatments during forming or machining of the material. The outgassing further contributes to the buildup of hydrocarbons within the environment. In yet further instances, the presence of hydrocarbons within the enclosed environment can be increased due to any number of faults or equipment errors such as overheating, fires, spills and leaks.

While it is understood that any of these sources of hydrocarbons may not pose a threat individually, overtime the magnitude of hydrocarbons within air being recirculated throughout the environment can accumulate to potentially hazardous levels.

An air purifier reactor is often referred to as a hydrocarbon burner, and is used to remove hydrocarbons from the atmosphere. The reactor typically includes a catalyst that operates at temperatures in excess of 287-315° C. (550-600° F.) in order to obtain the catalytic activity necessary to convert the hydrocarbons to carbon dioxide and water

SUMMARY OF THE INVENTION

In one exemplary embodiment a hydrocarbon burner for an enclosed environment includes a heat exchanger having a first heat exchanger inlet connected to an inlet of the hydrocarbon burner and a first heat exchanger outlet connected to a heater, and a second heat exchanger inlet connected to a reactor outlet and a second heat exchanger outlet connected to an outlet of the hydrocarbon burner, a reactor including a reactor inlet, the reactor outlet, and a catalyst mixture disposed in a reactor bed between the reactor inlet and the reactor outlet, the heater connecting the first heat exchanger outlet to the reactor inlet, and wherein the reactor is a low temperature reactor configured to convert at least one hydrocarbon to at least one of $H_2O$ and $CO_2$.

An exemplary method for preventing a buildup of hydrocarbons in an enclosed environment includes removing a portion of air from an environmental system, passing the portion of air through a regenerative heat exchanger, heating an output of the regenerative heat exchanger in a heater, providing an output of the heater to a reactor and converting hydrocarbons entrained in the output into at least one of $H_2O$ and $CO_2$ in the reactor, passing an output of the reactor through the regenerative heat exchanger, thereby transferring heat from the output of the reactor to the portion of air, and returning the output of the reactor to the environmental system.

In one exemplary embodiment an enclosed environmental system includes a sealed environment, an air recirculation and filtration system connected to the sealed environment, a hydrocarbon burner connected to the air recirculation and filtration system, the hydrocarbon burner including a regenerative heat exchanger.

These and other features of the present invention can be best understood from the following specification and drawings, the following of which is a brief description.

DETAILED DESCRIPTION OF AN EMBODIMENT

Figure 1:
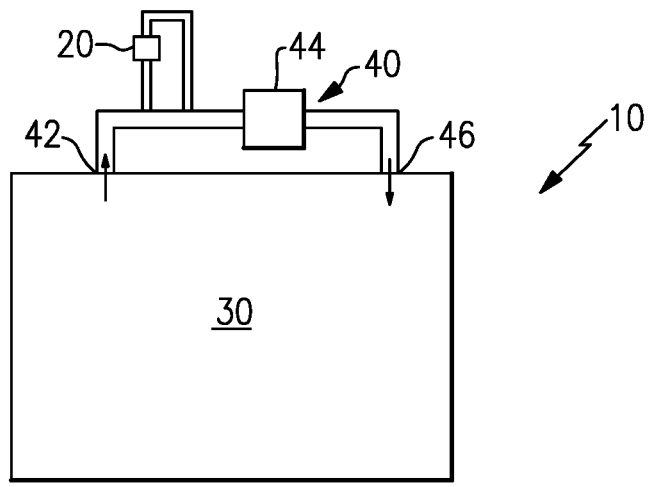
FIG. 1 illustrates an exemplary enclosed environmental system including a hydrocarbon burner.

FIG. 1 schematically illustrates an exemplary enclosed environmental system 10 including a hydrocarbon burner 20. The enclosed environmental system 10 includes a sealed habitable environment 30 such as a space station or a submarine. The environment includes an air recirculation and filtration system 40 that removes air from the environment 30 at an outlet 42, passes the air through a filter 44, and returns the air to the environment 30 at an inlet 46. As can be appreciated by one of skill in the art, the illustrated air recirculation and filtration system 40 is a simplified system, and any known air recirculation and filtration system can be utilized to the same effect.

Connected to the air recirculation and filtration system 40 is a hydrocarbon burner 20. The hydrocarbon burner 20 provides a catalytic reaction of most hydrocarbons that reduces the hydrocarbons to $H_2O$ and/or $CO_2$. This reaction prevents accumulation of the hydrocarbons within the environment 30 to hazardous levels. This, in turn, extends the length of time that a given air supply is healthy and breathable for occupants of the enclosed environmental system 10.

The hydrocarbon burner 20 removes a portion of the air passing through the air recirculation and filtration system 40 and passes it through the hydrocarbon burner 20 to remove hydrocarbons from the air. Once passed through the hydrocarbon burner 20, the air is and returned to the air recirculation and filtration system 40.

The hydrocarbon burner 20 has a low volume, compared to existing hydrocarbon removal systems, and provides substantial savings in both volume and footprint within the environmental system 10. Further, as described below with regards to FIG. 2, the pressure drop across the hydrocarbon burner 20 is substantially small, thereby allowing the hydrocarbon burner to be integrated into air filtration and recirculation systems of existing enclosed environments, without requiring the existing air recirculation and filtration systems to be designed with incorporation of a hydrocarbon burner in mind.

Some exemplary hydrocarbon burners 20 operate at a reduced temperature such as 205° C., below the decomposition temperatures for typical refrigerants that may be included within the enclosed environmental system, such as R134a, R11, R12. Operation below the decomposition temperature eliminates the potential generation of hazardous decomposition products such as Hydrogen Fluoride or Hydrogen Chloride gas. This reduces the potential for poisoning the atmosphere if the unit continues to run after a refrigerant leak, and eliminates the need for an acid gas scrubber (such as lithium carbonate bed) downstream of the reactor. Further, by not generating acid gases, there is no potential to "overwhelm" an acid gas scrubber, nor risk that poor maintenance could reduce the effectiveness of the acid gas scrubber and therefore result in a poisoned atmosphere.

Figure 2:
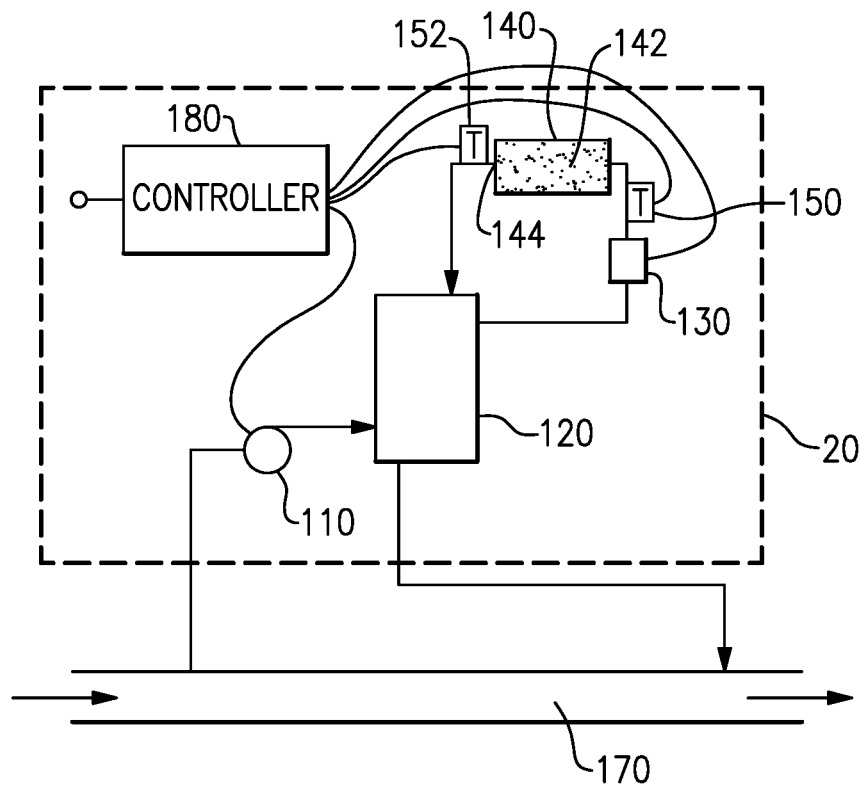
FIG. 2 schematically illustrates an exemplary hydrocarbon burner in greater detail separate from a corresponding closed environmental system.

With continued reference to FIG. 1, FIG. 2 schematically illustrates a reduced temperature hydrocarbon burner 20, according to one example. The reduced temperature hydrocarbon burner 20 includes a fan 110, a regenerative heat exchanger 120, a heater 130, a reactor 140 including a catalyst mixture 142, multiple temperature sensors 150, 152 and a controller 160.

The reduced temperature hydrocarbon burner 20 is connected to an existing flow stream 170 of an enclosed environment. As illustrated in the example of FIG. 1, the existing flow stream 170 can be part of an air recirculation and filtration system 40. In alternative examples, the existing flow stream 170 is any other dedicated air stream. The system performance of the reduced temperature hydrocarbon burner 20 can be varied to suit a particular environment depending on the specific contaminants that are expected, the expected generation rate of the contaminants, and the acceptable safety levels of the contaminants. In some examples, the flow rate of the existing flow stream 170 is in the range of 3-4 actual cubic feet per minute (AFCM).

The hydrocarbon burner 20 removes a small percentage of various contaminants from the air flow through the hydrocarbon burner 20, but the high conversion efficiency and continuous operation steadily reduces occasional releases of contaminants, and maintains a safe, continuous level of contaminants from metabolic processes or outgassing.

In order to drive air through the hydrocarbon burner 20, air is drawn by the fan 110 from the existing flow stream 170. The air is warmed by the regenerative heat exchanger 120 which exchanges heat from an outlet 144 of the reactor 140 to partially warm the air to be processed. A heater 130 with an outlet temperature sensor 150 is used to further heat and control the temperature of the air entering the reactor 140. The reactor 140 is a passive device loaded with a mix of appropriate catalysts, and designed to minimize flow pressure drop and maximize conversion efficiency. Purified air then exits the reactor 140 at the outlet 144 and is passed to the heat exchanger 120, where it is cooled by the air traveling to the reactor 140 before being returned to the main air stream in the existing flow stream 170.

Each of the temperature sensors 150, 152, as well as the heater 130 and the fan 110, is connected to a controller 180. The controller 180 provides control outputs to the heater 130 and the fan 110 based on the temperature sensor inputs from the temperature sensors 150, 152. The controller 180 can be a dedicated hydrocarbon burner controller, or a general controller connected to the hydrocarbon burner 20, depending on the system in which the hydrocarbon burner is being incorporated. The fan 110 and heater 130 are operated to maintain the reaction within the reactor 140 at a control point temperature, with the control point being below the decomposition temperature of one or more refrigerants found within the enclosed environment.

In a practical example, the actual control point (including the operating temperature) of a given hydrocarbon burner 20 is a function of four factors: a desired conversion effectiveness for the compounds being converted, the expected hydrocarbons within the enclosed environment, the flow rate through the reactor 140, and the physical size of the reactor 140. Utilizing these four factors, one of skill in the art can determine a desirable control point for the temperature entering the reactor 140, and the fan 110 and heater 130 can be controlled to ensure that the air entering the reactor 140 is at the desired control point according to known control techniques.

In order to increase efficiency of the hydrocarbon burner 20, air drawn from the existing air flow stream 170 is heated to a temperature close to an ideal temperature of the reactor 140 prior to being passed through the reactor 140 using a regenerative heating process. Initially, the air is passed through the heat exchanger 120, where heat from air exiting the reactor 140 is transferred to the air traveling to the reactor 140 using conventional heat exchanger techniques. The air traveling to the reactor 140 then enters a heater 130. The heater 130 is a low wattage heater with the output temperature being monitored by the temperature sensor 150 and controlled by the controller 180. The heater 130 further warms the air to be at the control point temperature.

Once warmed, the air is passed to the reactor 140 where the catalyst mixture 142 converts hydrocarbons entrained in the air stream into $H_2O$ and/or $CO_2$. After exiting the reactor 140, the air is passed again to the heat exchanger 120 prior to being returned to the enclosed environment at a temperature that is at or near the ambient temperature of the environment.

In one exemplary system, the control temperature of the reactor 140 is in the range of 400-470° F. (205 to 244° C.). In the exemplary system, the regenerative heating process has an effectiveness of approximately 90%. As used herein, the effectiveness of the regenerative heat system refers to the percentage of heat recirculated from air exiting the reactor 140 to air traveling to the reactor 140. In the exemplary system, the returned air is approximately 20° F. (11° C.) above the ambient temperature of the existing air flow system 170.

Due to the regenerative nature of the heating system, the total power required to add heat to the air being passed to the reactor is limited to the amount of heat required to makeup the lost heat due to the 90% effectiveness, once the system reaches operating temperature. As a result of the minimal additional heat required, the heat load on the enclosed environment is minimal.

The reactor 140 contains a mixture 142 of high activity catalysts. The specific catalysts are chosen base on the expected trace contaminant hydrocarbons that need to be removed from the enclosed environment. In one example, the reactor 140 includes media for treating the hydrocarbons. The media includes a catalyst support having at least one of carbon material or metal oxide in the form of granular particles or a monolithic structure with a plurality of pores, and a metal catalyst disposed on the catalyst support. By way of example, the metal catalyst can be particles of metal that are attached to the catalyst support.

The metal catalyst in some examples is selected from platinum, gold, palladium, ruthenium, copper, manganese and combinations, or their oxides thereof. The catalyst support is formed of at least one of carbon material or metal oxide. In one example, the carbon material can be an activated carbon. In one example the metal oxide can be alumina, silica, titanium oxide, or cerium oxide. The catalyst support, if in granular shape, has a size of 4 to 40 mesh and a pore volume of between 0.1 and 0.6 cubic centimeter per cubic centimeter of support material, or monolith structure. The metal catalyst is capable of converting hydrocarbon to water at the temperature of equal or less than 250° C. In one further example, the media has 2%-30% by weight of the metal catalyst.

The exemplary hydrocarbon burner is relatively compact, low-power, and simplified in comparison to reactors that require high temperatures and burners. The compactness can also be represented by performance metrics. For example, the reactor bed has a gas hourly space velocity (GHSV) of 36,800 $hr^{-1}$ and both hydrocarbon conversion efficiencies are at 84% and above at 0.5% methane concentration at temperature of 244° C.

The controller 180 monitors operations of the reactor 140 using the temperature sensor 152 positioned at the outlet of the reactor 140. In some examples the temperature sensor 152 is integral to the reactor 140. In alternative examples the temperature sensor 152 is a distinct component disposed immediately downstream of an outlet of the reactor 140. By monitoring the outlet temperature of the reactor 140, the controller 180 can measure the effectiveness of the catalyst mixture 142 over time, and can ensure that the input temperature is maintained at below a decomposition temperature of any halocarbons that may be in the enclosed environment.

The total quantity, and specific composition, of the catalyst mixture 142 within the reactor 140 is sized for a given application based on an analysis of a the desired trace contaminants to be controlled, the likely or maximum generation rates of the trace contaminants, and the desired control level for each. The sizing algorithm also includes accommodation for "cleanup/recovery" after a leak or other casualty causing an unexpectedly large spike in the trace contaminant. Generation rates within the vehicle or habitat after a casualty are typically based on a Failure Modes and Effects Analysis (FMEA). One exemplary size reactor 140 is about four inches long and two inches in diameter.

The fan 110 is sized to provide sufficient flow to draw air from the existing flow stream 170, and to drive the air through the heater 130, the reactor 140, and the heat exchanger 120. In some alternate examples air is drawn from the existing system 170 at a position where the pressure is greater than the ambient air pressure where the air is returned to the existing flow stream 170. In the alternate examples, the fan can be omitted, or reduced in size, as the pressure differential will further aid the air in passing through the hydrocarbon burner 20. By way of example, in one alternative system the air is draw upstream of a $CO_2$ scrubbing bed, and returned downstream of the $CO_2$ scrubbing bed. In such an example, the $CO_2$ scrubbing bed creates a substantial pressure differential which drives air through the hydrocarbon burner 20.

The hydrocarbon burner 20 is scalable in size and can be sized for any given application. One characteristic of the reactor 140 allowing a small size is the ability of the reactor 140 to operate at very high Gas Hourly Space Velocity (GHSV). A high GHSV operation allows the reactor 140 to be easily integrated into existing systems, such as those included on space stations and/or submarines. The hydrocarbon burner 20 is designed to minimize impact on existing equipment by being small in size, and having minimal impact on the air pressure and flow through the existing flow stream 170. The form factor (length vs. depth) of the hydrocarbon burner 20 is flexible.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A hydrocarbon burner for an enclosed environment comprising:
   a heat exchanger having a first heat exchanger inlet connected to an inlet of the hydrocarbon burner and a first heat exchanger outlet connected to a heater, and a second heat exchanger inlet connected to a reactor outlet and a second heat exchanger outlet connected to an outlet of the hydrocarbon burner;
   a reactor including a reactor inlet, the reactor outlet, and a catalyst mixture disposed in a reactor bed between the reactor inlet and the reactor outlet;
   the heater connecting the first heat exchanger outlet to the reactor inlet; and
   wherein the reactor is a low temperature reactor configured to convert at least one hydrocarbon to at least one of $H_2O$ and $CO_2$.

2. The hydrocarbon burner of claim 1, further comprising a controller controllably coupled to the heater and configured to control a temperature of air outlet from the heater.

3. The hydrocarbon burner of claim 2, further comprising a first temperature sensor communicatively coupled to the controller and disposed at an outlet of heater.

4. The hydrocarbon burner of claim 3, further comprising a second temperature sensor disposed at the reactor outlet, the second temperature sensor being communicatively coupled to the controller.

5. The hydrocarbon burner of claim 4, wherein the controller is configured to control a reaction temperature within the reactor based at least in part on sensor readings of the first and second temperature sensors.

6. The hydrocarbon burner of claim 5, wherein the controller is configured to maintain a reaction temperature below a decomposition temperature of at least one refrigerant expected to be within the enclosed environment.

7. The hydrocarbon burner of claim 1, wherein the heat exchanger is a regenerative heat exchanger and is configured to transfer heat to a first passage connecting the first heat exchanger inlet and the first heat exchanger outlet to a second passage connecting the second heat exchanger inlet to the second heat exchanger outlet.

8. The hydrocarbon burner of claim 7, wherein the regenerative heat exchanger has an effectiveness of at least 90%.

9. The hydrocarbon burner of claim 1, wherein the catalyst mixture comprises at least one of platinum, platinum oxide, gold, gold oxide, palladium, palladium oxide, ruthenium, ruthenium oxide, copper, copper oxide, manganese, and manganese oxide.

10. The hydrocarbon burner of claim 1, wherein an inlet to the hydrocarbon burner is positioned at a higher ambient pressure than an outlet from the hydrocarbon burner.

11. The hydrocarbon burner of claim 10, wherein the inlet to the hydrocarbon burner is positioned upstream of a $CO_2$ scrubbing bed, and the outlet from the hydrocarbon burner is positioned downstream of the $CO_2$ scrubbing bed.

12. The hydrocarbon burner of claim 1, further comprising a fan disposed between the first heat exchanger inlet and an inlet to the hydrocarbon burner.

13. A method for preventing a buildup of hydrocarbons in an enclosed environment comprising:
removing a portion of air from an environmental system;
passing the portion of air through a regenerative heat exchanger;
heating an output of the regenerative heat exchanger in a heater;
providing an output of the heater to a reactor and converting hydrocarbons entrained in the output into at least one of $H_2O$ and $CO_2$ in the reactor;
passing an output of the reactor through the regenerative heat exchanger, thereby transferring heat from the output of the reactor to the portion of air; and
returning the output of the reactor to the environmental system.

14. The method of claim 13, wherein transferring heat from the output of the reactor to the portion of air comprises raising the temperature of the portion of air to at least 90% of a desired temperature at an input to the reactor.

15. The method of claim 13, wherein removing the portion of air from the environmental system comprises drawing air out of an existing environmental system via a fan disposed upstream of the regenerative heat exchanger.

16. The method of claim 13, wherein the output of the reactor returned to the environmental system is approximately 20° F. (11° C.) above the ambient temperature of the environmental system.

17. The method of claim 13, wherein the portion of air removed from the environmental system is at a first ambient pressure, and the output of the reactor is returned to the environmental system at a position having a second ambient pressure, the second ambient pressure being lower than the first ambient pressure.

18. The method of claim 13, wherein converting hydrocarbons entrained in the output into at least one of $H_2O$ and $CO_2$ in the reactor comprises passing the hydrocarbons through a catalyst mixture comprised of at least one of platinum, platinum oxide, gold, gold oxide, palladium, palladium oxide, ruthenium, ruthenium oxide, copper, copper oxide, manganese, and manganese oxide.

19. An enclosed environmental system comprising:
a sealed environment;
an air recirculation and filtration system connected to the sealed environment; and
a hydrocarbon burner connected to the air recirculation and filtration system, the hydrocarbon burner including a regenerative heat exchanger having a first heat exchanger inlet connected to an inlet of the hydrocarbon burner and a first heat exchanger outlet connected to a heater, and a second heat exchanger inlet connected to a reactor outlet and a second heat exchanger outlet connected to an outlet of the hydrocarbon burner, a reactor including a reactor inlet, the reactor outlet, and a catalyst mixture disposed in a reactor bed between the reactor inlet and the reactor outlet, the heater connecting the first heat exchanger outlet to the reactor inlet and wherein the reactor is a low temperature reactor configured to convert at least one hydrocarbon to at least one of $H_2O$ and $CO_2$.

\* \* \* \* \*